United States Patent Office 3,176,112
Patented Mar. 30, 1965

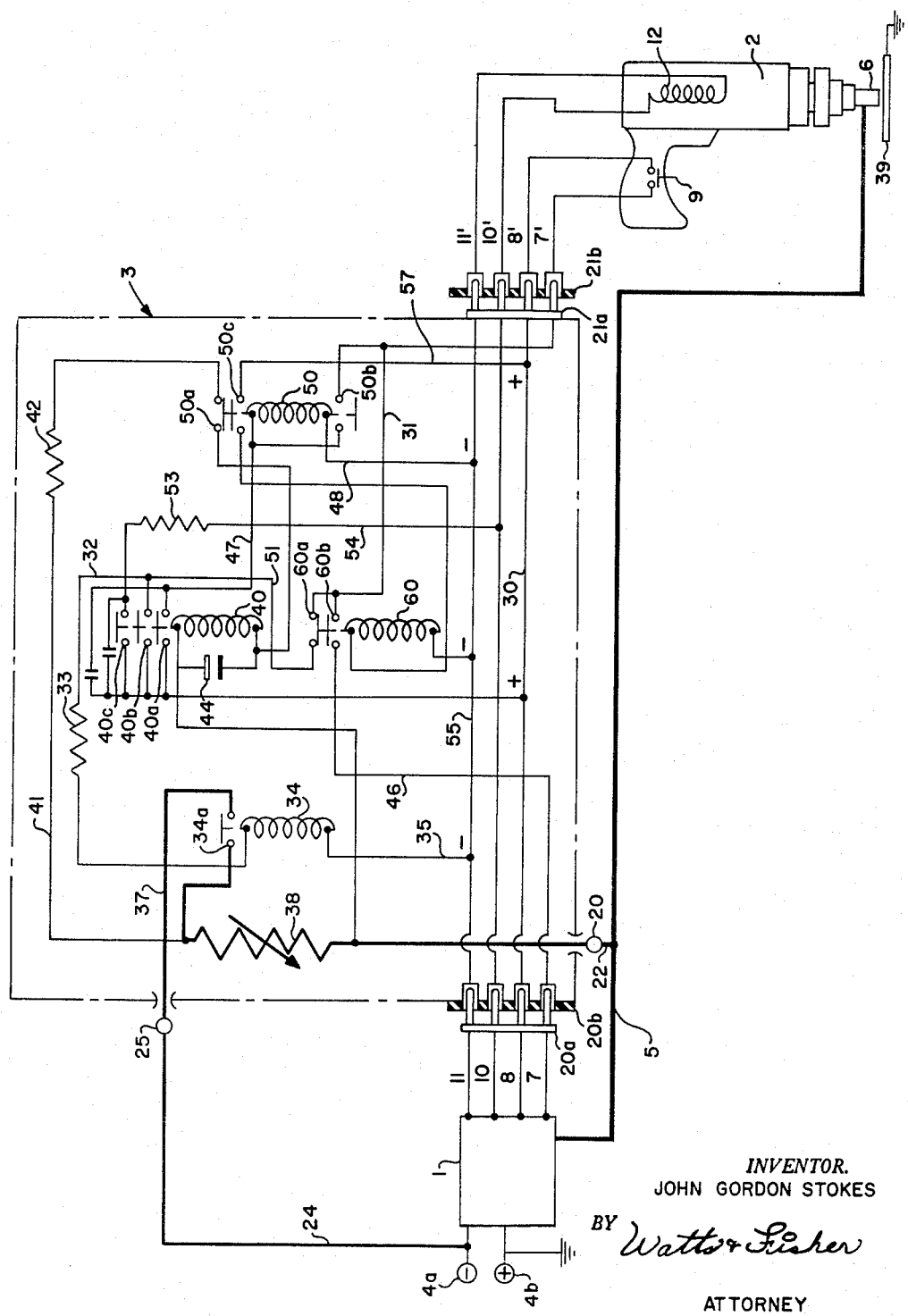

3,176,112
ELECTRIC ARC STUD WELDING APPARATUS
John Gordon Stokes, Chelmsford, Essex, England, assignor to Crompton Parkinson Limited
Filed Dec. 6, 1961, Ser. No. 157,415
Claims priority, application Great Britain, Dec. 13, 1960, 42,853/60
3 Claims. (Cl. 219—98)

This invention relates to welding and more particularly to a method of arc welding metal studs and/or the apparatus therefor.

In the electric arc welding of metal studs to metal plates or other workpieces, it is sometimes necessary to preheat the stud before the welding operation. For example, when welding aluminum studs having a diameter of about one-half inch or more, the thermal conductivity of the stud is sufficient to bring about an appreciable drain of heat from the welding resulting in the formation of an unsatisfactory weld. This is because the strength of the weld depends partly on the presence of the fillet of weld metal. It is therefore important that this fillet should form a good bond with the side of the stud, but this cannot occur if the root of the stud is too cool. Preheating the stud overcomes this difficulty and may also be required in other and different circumstances with other types of studs.

The preheating function is sometimes accomplished by placing the studs in an oven immediately prior to use and using a pair of tongs to remove the stud and insert it into the chuck of the welding tool. However, the prolonged period for which the individual studs may be maintained at the preheating temperature allows a relatively thick oxide film to build up and cover the stud. The oxide film prevents the weld fillet from forming an effective bond with the side of the stud. The oven method of preheating is also inconvenient because it requires the oven to be portable so it can be moved around from side to side as the welding proceeds.

In the present invention the preheating is accomplished by preceding the main welding arc with an arc of reduced intensity sufficient to produce preheating of the stud but not to melt the surface of the stud or the workpiece to any appreciable extent. The low intensity arc is maintained for a controlled period of time necessary to give the required amount of preheating. At the end of the preheating period the low intensity arc is automatically increased to the main welding arc so that no interruption of the arc occurs.

The invention further contemplates that the preheating be carried out after the stud has been inserted in the chuck of the welding tool. Not only does this avoid the need for a separate oven, but since the welding arc actually takes over directly from the preheating arc, there is no opportunity for the stud to cool down as normally occurs when it is transferred from the oven to the chuck of the welding tool. When welding an aluminum stud the operation is preferably carried out in a non-oxidising atmosphere by shielding the arc with a stream of inert gas such as argon. This inhibits the formation of an oxide film and improves the bonding of the weld fillet.

The invention further provides that the magnitude of the current flowing in the preheating arc and the duration of the arc may be varied to suit each particular stud welding application. In general the current in the preheating arc should flow for the small number of seconds necessary to assure that the preheating effect extends sufficiently far up the stud. For example, a current of 70–80 amperes flowing for three seconds has been found to satisfactorily preheat a ½" diameter aluminum or aluminum alloy stud.

In general the stud should be preheated to a height at least equivalent to that of the weld fillet. This height is related to the diameter of the stud and for practical purposes may be taken as 1½ times the diameter of the stud. If a preheating current of 70–80 amperes is used, as described above, the stud is heated to approximately 120° C. to a height of ¾" before the welding process itself is started. To achieve any practical advantage the above predetermined height of the stud must attain a preheating temperature of at least 70° C.

A preheating arc is quite different in character and function from an arc of reduced intensity which has previously been used in stud welding processes and is referred to as a pilot arc. The purpose of the pilot arc is merely to prepare a path for the main arc and to avoid the formation of the main welding arc if, for example, the workpiece is corroded and the conditions are unsuitable for a satisfactory weld. Under these conditions the pilot arc fails to establish itself and no path is prepared for the main arc. A pilot arc commonly has a magnitude of approximately 15 amperes. The pilot arc flows only for a very small fraction of a second because once the pilot arc is established, it has served its purpose and the main arc can be initiated. Obviously, a pilot arc of this character can have no appreciable preheating effect on the stud. Moreover, there is no form of positive control over the duration of the pilot arc.

As previously mentioned preheating is only required under particular circumstances. It is, therefore, desirable that the facility of providing the preheating arc should be auxiliary to the main controller for the welding process as a whole. There are many forms of the controller which are well known. In general the controller provides steps of control leading to the retraction of the stud from the workpiece to strike the arc, the closing of a main contactor to supply the full welding current, the return of the stud to the workpiece at the completion of the welding operation and, finally, the interruption of the current supply either before or after the return of the stud to the workpiece.

In order to provide the additional facility of a preheating arc when using a controller of this general type, the invention provides that the apparatus establishing the preheating operation be provided in the form of an auxiliary unit which may be interposed between the main controller and the welding tool. The preheating apparatus as embodied in this auxiliary unit comprises a timing device, a limiting impedance and a relay operated by a starting switch on the welding tool. The operation of the relay serves first to complete a circuit including the stud, the workpiece and the limiting impedance so as to allow a limited current to flow in this circuit. Second, the relay completes a circuit to a solenoid in the welding tool for retracting the stud from the workpiece so as to strike an arc for preheating purposes. Third, the relay starts the operation of the timing device which at the end of a preset interval causes the controller to increase the current in the arc to a value sufficient for welding purposes. At this stage the function of the auxiliary unit is complete, and the remainder of the cycle is completed under the control of the main welding controller. At this point the main controller, as was outlined above, first causes the operation of a main contactor to supply full welding current to the arc and also starts the operation of a second timing device. At the end of its preset interval the second timing device interrupts the circuit to the solenoid in the welding tool so as to return the stud to the workpiece. It also interrupts the main welding current.

The auxiliary unit may also include a second relay, the coil of which is connected across the limiting impedance so that the relay is energized by the flow of preheating current through the limiting impedance. The second relay functions to complete the circuit to the solenoid for the retraction of the stud and to start the operation of the timing device. Such an arrangement has the advantage that the subsequent steps in the preheating operation only follow provided the preheating current flows in the normal manner.

Accordingly, it is an object of this invention to provide a method of and a new and improved apparatus for automatically preheating a stud before welding the stud to a workpiece.

Another object of this invention is to provide a method of and an apparatus for automatically preheating a stud before welding it to a workpiece wherein the heating is accurately and precisely controlled and no cooling of the stud occurs before welding.

Still another object of this invention is to provide a method of and an apparatus for individually preheating each stud substantially instantaneously immediately prior to welding the stud to a workpiece.

A further object of this invention is to provide a method of and a new and improved apparatus for preheating each individual stud by a low intensity arc.

Yet another object of this invention is to provide a method and an apparatus for preheating each individual stud by a low intensity arc which is immediately followed without interruption by the main welding arc.

Other objects and a fuller understanding of the invention may be had by referring to the following description and claims taken in conjunction with the accompanying drawing in which:

The sole figure is a diagrammatic illustration of the apparatus of the invention including a schematic drawing of its electrical circuitry.

Referring now to the drawing, the preferred embodiment of the invention is shown as comprising three basic components, namely a main controller 1, a welding tool 2, and an auxiliary unit 3 interposed between the controller 1 and the tool 2. The details of the controller itself are not illustrated since it may be any one of a number of controllers of the general type described above.

The controller is provided with a pair of direct current input terminals 4a, 4b. The positive terminal 4b is connected to earth as shown. The controller is also provided with five output conductors 5, 7, 8, 10, 11. Conductor 5 carries the main welding current and for purposes of simplicity is shown as connected directly to a stud 6 in the welding tool 2. Conductors 7 and 8 are connected to a push button switch 9 in the handle of the tool 2. The push button switch 9 is used to initiate the welding cycle. The remaining two conductors 10 and 11 carry current from the controller 1 to energize a solenoid 12 in the welding tool 2 to retract the stud 6 from the workpiece against the biasing effect of a spring (not shown). The welding tool 2 may also include a device for providing a shield of argon or other inert gas during the welding of aluminum studs.

The conductors 7, 8, 10, 11 lead from the controller 1 to a four-pin plug 20a which is shown as mating with a four-pin socket 20b. Corresponding conductors 7′, 8′, 10′, 11′ lead from the welding tool 2 to a four-pin socket 21b which is shown as mating with the four-pin plug 21a. During those welding operations when the auxiliary preheating unit 3 is not to be used the plug 20a will mate directly with the socket 21b so that the welding tool 2 is controlled directly by the main controller 1. As shown in the drawing, however, the auxiliary unit 3 which forms the subject of the present invention is interposed between the main controller 1 and the welding tool 2. The auxiliary unit 3 is connected ino the welding circuit by plugging the plug 20a of the controller 1 into a socket 20b provided on the auxiliary unit and by plugging the plug 21a of the auxiliary unit into the socket 21b. In addition to the above described connections between the controller 1 and the auxiliary unit 3, a conductor 22 connects a terminal 23 to the main power cable 5 and a further conductor 24 connects the negative input terminal 4a of the controller 1 to a terminal 25 which is the negative input terminal of the auxiliary unit. The conductors 8 and 11 take positive and negative supply respectively to the corresponding pins of the plug 20a and hence to the conductors 30 and 55 respectively.

Initiation of the preheating and welding cycle is accomplished by holding the stud 6 as secured in the chuck of the welding tool 2 against a workpiece and depressing the push button 9. Closing the push button 9 energizes the relay coil 34 from the positive supply conductor 30 by way of conductor 8′, push button 9, conductor 7′, conductor 31, normally closed contacts 60a of a relay 60, a conductor 32, a resistance 33 which is connected to one side of the coil of relay 34, a conductor 35 which connects the other side of the coil of relay 34 to the negative supply conductor 55. Upon energization, relay 34 closes its normally open contacts 34a to complete a circuit from the negative input terminal 4a of the controller through the current limiting impedance 38 to the stud 6. The latter circuit is completed via conductor 24 which is connected to the negative terminal 4a, conductor 37, contacts 34a, limiting resistance 38, connector terminal 23, conductor 22, conductor 5 which is connected to the stud 6, the stud 6 is held against the workpiece shown in the form of a plate 39 which is grounded as is the positive input terminal 4b of the controller. Completion of the circuit establishes a flow of current between the stud 6 and the plate 39, which current is limited by the inclusion in the circuit of the limiting resistance 38.

The current flow through the resistance 38 establishes a potential difference between its ends which serves to energize a relay 40. The relay 40 is energized by a conductor 41 connected to one end of the resistance 38, a resistance 42, normally closed contact 50a of a relay 50, the coil of the relay 40 and a conductor 43 which is connected to the other side of the resistance 38. A capacitor 44 is connected in parallel with the coil of relay 40 to provide a time delay in the release of relay 40. Operation of relay 40 follows shortly after operation of the relay 34 and it closes three pairs of normally open contacts 40a, 40b, 40c. The closure of contact 40a completes a circuit from the positive supply conductor 30 via conductor 46, contact 40a, conductor 47, the coil of relay 50, conductor 48, to the negative supply conductor 55. Thus, closure of the contacts 40a completes a circuit for the energization of relay 50.

The relay 50 is a pneumatic timing relay for timing the duration of the preheating current. Its contact 50a consequently opens a preset interval after the coil has been energized. In a particular example this delay may be three seconds. A pair of auxiliary contacts 50b, however, are closed immediately without any time delay.

The contacts 40b are connected in parallel with the push button switch 9 by way of the conductors 30, 46, a further conductor 51, the normally closed contacts 60a of the relay 60 and the conductor 31. Consequently, supply is maintained to the relay 34 even if the push button 9 is released.

Closure of the contacts 40c completes a circuit from the positive supply conductor 30 via the conductor 46, contacts 40c, resistance 53, a conductor 54, the conductor 10′, solenoid coil 12 in the welding tool 2 and the conductor 11′ which is connected to the negative supply conductor 55. Accordingly, the solenoid 12 is energized to retract the stud 6 from the plate 39 to strike an arc. The current flowing in the arc, and thus the intensity of the arc, is limited by the resistance 38 which has been selected to give the necessary degree of preheating.

The preheating arc continues to burn until the end of the time period as set by the time delay relay 50. At the end of this period, the contacts 50a open and a further pair of contacts 50c close. The closing of contacts 50c completes a circuit from the positive supply conductor 30 via the conductor 57, contacts 50c, the coil of relay 60, the other side of which is connected to the negative supply conductor 55. The relay 60 is energized and opens its contacts 60a and closes its normally open contacts 60b. The closing of contact 60b transfers any further control of the welding cycle to the main controller 1. As shown by the drawing contact 60b causes the auxiliary unit to be by-passed by connecting conductor 7 directly to conductor 7'. The control circuit may be traced from the conductor 7 through contacts 60b, conductor 31, conductor 7', push button switch 9, conductor 8', and conductor 30 to conductor 8 of the main controller. In other words, at this stage a circuit is completed between the conductors 7 and 8 in the same way as would normally be the case at the start of the operation in the absence of the auxiliary unit 3. In the absence of the auxiliary unit 3 this circuit is completed directly by closing push button 9 and the normal welding cycle follows. As just described, however, the inclusion of the auxiliary unit 3 introduces the preheating arc before the main welding cycle.

During the change-over of control from the auxiliary unit to the main controller continuity of the control circuit and of the arc is maintained by time delayed release of relay 40. The capacitor 44 delays the release of relay 40 sufficiently to allow the main controller to operate. Release of the relay 40 in turn releases the relays 50, 60 and the control system is reset for the next welding operation.

Although the specification describes the invention in detail it is believed to comprise essentially the method of and an apparatus for preheating a stud by an electric arc immediately prior to welding it to a workpiece. The method includes striking an arc, limiting the intensity of the arc for a predetermined period sufficient to produce preheating and increasing the intensity of the arc after the predetermined interval to cause the stud to be welded to the workpiece. The apparatus comprises a control unit to be connected between a welding tool and a main controller to limit the current supplied to the welding tool to establish a relatively low intensity arc to preheat the stud for a predetermined period after which the control unit causes the main controller to increase the current in the arc to full welding current.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An arc welding system comprising, a main welding controller having input terminals connected to a main power supply and a set of output terminals, a welding tool including an end weldable stud removably secured in the chuck of the welding tool, an auxiliary controller connected to said welding tool and to the output terminals of said main controller, said auxiliary controller supplying a current to said stud for establishing a low intensity arc between said stud and a workpiece sufficient to heat the weldable end of the stud without appreciably melting the stud or the workpiece, said auxiliary controller including time delay means for maintaining the current in the arc for a predetermined period of time adequate to heat the weldable end of the stud to a height of at least a weld fillet which is to fix the stud to the workpiece, and said auxiliary controller connecting said welding tool directly to said main controller at the end of said predetermined period to cause a full welding current to flow in said arc.

2. An electric arc welding system including a main welding controller, a welding tool adapted to be connected to the controller, an auxiliary controller connecting the main controller to the welding tool, said auxiliary controller controlling the intensity of an arc struck between a stud held in the chuck of the welding tool and a workpiece, said auxiliary controller comprising a current limiting impedance for limiting the current supplied to the stud to a value sufficient to heat the stud without appreciably melting the surface of the stud or workpiece when an arc is struck between the stud and the workpiece, circuit means connecting one end of said impedance to the stud, a relay including a set of contacts connecting the other end of said impedance to a power source, the operation of said relay being controlled by a starting switch on the welding tool, operation of said starting switch causing a limited current flow through said impedance to said stud for establishing a low intensity preheating arc, a timing device connected to said impedance and to said relay and being responsive to the current flow through the impedance to deenergize said relay after a predetermined interval of sufficient duration to assure that the weldable end of the stud is heated to a height of at least approximately 1½ times its diameter, and bypass circuit means controlled by said timing device and connecting said welding controller directly to said welding tool to supply full welding current to said stud near the end of said predetermined interval.

3. An electric arc welding system including a main welding controller, a welding tool connected to the controller and an auxiliary unit connected in interposed relation between the controller and the welding tool, said auxiliary unit controlling the intensity of an arc struck between a stud held in the chuck of the welding tool and a grounded workpiece, said auxiliary unit comprising a current limiting impedance, circuit means connecting one end of said impedance to said stud, a first relay having a set of contacts connecting the other end of said current limiting impedance to the main power supply, said first relay being connected to and controlled by a starting switch on said welding tool, a second relay responsive to current flow in said current limiting impedance and having a first set of contacts connected in series circuit with a potential source and a retracting coil in the welding tool, said second relay being energized by current flow in said current limiting impedance and closing its first set of contacts to energize the retracting coil to retract the stud from the workpiece for striking an arc, the current in the arc being limited by said current limiting impedance to a value sufficient to preheat the stud, a timing relay connected in series circuit with a potential source and a second set of contacts of said second relay, said timing relay operating after a predetermined period to bypass the control circuit of said auxiliary unit to cause said main controller to increase the current in the arc for welding purposes, and said second relay resetting said auxiliary controller to its initial state at the end of a completed welding cycle.

4. The method of welding a metal stud to a workpiece comprising:

(a) supplying a current to the metal stud;

(b) striking an arc between the metal stud and the workpiece;

(c) limiting the current supplied to the stud to a value greater than an initiating arc current of 10–15 amperes and substantially less than full welding current so as to produce an arc of an intensity sufficient to produce preheating of the stud without melting the surface of the stud or the workpiece to any appreciable extent;

(d) maintaining the limited current for a period of time greater than a fraction of a second and on the order of one to three seconds so as to be sufficient to preheat the stud to at least 70° C. to a height at least equivalent to that of the weld fillet which is to finally secure the stud to the workpiece and which is on the order of 1½ times the diameter of the stud; and (e) applying full welding current to the stud to weld the stud to the workpiece.

5. A welding system for welding an end weldable stud to a workpiece, said system comprising:
(a) a main welding controller having a normally open main control circuit and a main welding circuit, said main welding circuit connecting a stud and a workpiece in circuit with an energy source when the main control circuit is closed;
(b) an auxiliary controller having a normally open preheating circuit connecting the stud and the workpiece in circuit with the energy source through a current limiting impedance, said impedance limiting the current supplied to an arc struck between the stud and the workpiece to a value sufficient to heat the stud;
(c) a starting switch means for selectively closing said preheating circuit;
(d) said auxiliary controller further having:
(i) a timer means connected to said preheating circuit for maintaining the preheating circuit closed for a preselected interval adequate to cause heating of the weldable end of the stud and for thereafter opening said preheating circuit; and,
(ii) a transfer circuit responsive to said timing means and connected to said control circuit to close said main control circuit near the end of said preselected interval so that the main welding circuit applies full welding current to the stud and the workpiece.

6. The combination of claim 5 including in subparagraph (d):
(iii) a continuity means connected to said preheating circuit for maintaining said preheating circuit closed near the end of said preselected interval until said main welding circuit connects the stud and the workpiece in circuit with the energy source.

7. An electric arc welding system for welding an end weldable stud to a workpiece, said system comprising:
(a) a stud holding and retracting mechanism for positioning the weldable end of the stud against the workpiece, said mechanism having a retracting element for retracting the stud from the workpiece to produce a predetermined gap when energized and to thereafter return the stud to the workpiece when de-energized;
(b) a main welding controller having a normally open main control circuit, a welding current supply circuit connecting the stud and the workpiece to a current source when said main control circuit is closed, and a main retracting circuit connected to said retracting element and energizing said retracting element when said control circuit is closed and said welding current supply circuit is supplying current to said stud;
(c) a normally open starting switch means connected to said main control circuit for selectively closing said control circuit;
(d) a preheating controller having:
(i) a normally open bypass circuit means interposed between said starting switch means and said main control circuit;
(ii) a current limiting circuit connected to said current source and said stud;
(iii) a preheating current control means connected in said current limiting circuit to control the flow of current therein, said preheating current control means being connected to said starting switch means and causing a limited current to flow to said stud when said starting switch means is closed;
(iv) an auxiliary retracting circuit means connected to said retracting element and responsive to current flow in said circuit limiting current to energize said retracting element to retract the stud from the workpiece to strike a preheating arc when preheating current is flowing in said current limiting circuit, said current limiting circuit limiting current flow in the arc to a value sufficient to heat the weldable end of the stud without appreciably melting the surfaces of the stud and the workpiece;
(v) a timing means connected to said preheating current control means and being responsive to current flow in said current limiting circuit to cause said preheating current control means to stop the flow of preheating current after a preselected interval of a duration adequate to heat the weldable end of the stud, and,
(vi) circuit continuity means connected to said timing means and said bypass circuit means to close said bypass circuit means before the flow of preheating current stops.

8. An electric arc welding system including a main welding controller, a welding tool connected to the controller, and an auxiliary unit connected in interposed relation between the controller and the welding tool, said auxiliary unit controlling the intensity of an arc struck between a stud held in the chuck of the welding tool and a workpiece, said auxiliary unit comprising a current limiting impedance, circuit means connecting one end of said impedance to said stud, a first relay having a set of contacts connecting the other end of said current limiting impedance to the main power supply, said first relay being connected to and controlled by a starting switch on said welding tool, a second relay responsive to current flow in said current limiting impedance and having a first set of contacts connected in series circuit with a potential source and a retracting coil in the welding tool, said second relay being energized by current flow in said current limiting impedance and closing its first set of contacts to energize the retracting coil to retract the stud from the workpiece for striking an arc, the current in the arc being limited by said current limiting impedance to a value sufficient to preheat the stud, a timing relay connected in series circuit with a potential source and a second set of contacts of said second relay, said timing relay having a set of contacts closing after a predetermined period to bypass the control circuit of said auxiliary unit and to cause said main controller to increase the current in the arc for welding purposes.

References Cited by the Examiner
UNITED STATES PATENTS

| | | | |
|---|---|---|---|
| 2,648,748 | 8/59 | Sayer | 219—98 |
| 2,932,725 | 4/60 | Ainsworth et al. | 219—98 |
| 3,064,119 | 11/62 | Glorioso | 219—98 |

RICHARD M. WOOD, *Primary Examiner.*